United States Patent [19]

Crater

[11] Patent Number: 6,115,772
[45] Date of Patent: Sep. 5, 2000

[54] SYSTEM AND METHOD FOR HOST EXPANSION AND CONNECTION ADAPTABILITY FOR A SCSI STORAGE ARRAY

[75] Inventor: Michael Richard Crater, Arvada, Colo.

[73] Assignee: International Business Machines, Inc., Arnonk, N.Y.

[21] Appl. No.: 09/156,967

[22] Filed: Sep. 18, 1998

[51] Int. Cl.[7] .............................. G06F 13/00; G06F 13/10
[52] U.S. Cl. ................................. 710/129; 710/9
[58] Field of Search .................... 710/129, 62, 4, 710/101, 5, 52, 9, 105, 126, 100, 74, 3, 71, 131; 370/258, 402, 912; 709/203, 217, 250, 253, 219; 711/203, 112; 359/152; 385/88

[56] References Cited

U.S. PATENT DOCUMENTS

| | | | |
|---|---|---|---|
| 5,175,822 | 12/1992 | Dixon et al. ............................. | 395/275 |
| 5,239,632 | 8/1993 | Larner .................................... | 395/325 |
| 5,257,393 | 10/1993 | Miller . | |
| 5,313,465 | 5/1994 | Perlman et al. . | |
| 5,333,277 | 7/1994 | Searls .................................... | 395/325 |
| 5,367,647 | 11/1994 | Coulson et al. ......................... | 395/325 |
| 5,524,268 | 6/1996 | Geldman et al. ....................... | 395/825 |
| 5,596,727 | 1/1997 | Literati et al. .......................... | 395/281 |
| 5,717,949 | 2/1998 | Ito ........................................... | 395/824 |
| 5,721,840 | 2/1998 | Soga ....................................... | 395/309 |
| 5,771,397 | 6/1998 | Hospodor et al. . | |
| 5,893,138 | 4/1999 | Judd et al. . | |

OTHER PUBLICATIONS

IBM Technical Disclosure Bulletin, vol. 38, No. 06, Jun. 1995, "Software Solution for Coordinating a Small Computer Interface with Multiple Drives".

*Primary Examiner*—Gopal C. Ray
*Attorney, Agent, or Firm*—Oppenheimer, Wolfe & Donnelly, LLP

[57] ABSTRACT

An interface for expanding the number of SCSI hosts that can access a storage array includes a SCSI interface chip for receiving a SCSI command from a host via a SCSI bus, a domain indicator for providing a domain number assigned to the SCSI chip, a memory device for storing data and code, and a processing unit responsive to the code and operative to generate a device address from the domain number, the target number, and the logical unit number, and to execute the SCSI command with a particular device of the storage array corresponding to the device address. The domain indicator may be either hardware based (e.g., a mechanical selector switch) or software based (e.g. written to a data storage device of the interface via a SCSI host or WIE the storage array). A method for interfacing a SCSI host with a storage array includes the steps of receiving a SCSI command from the host via a connection to the SCSI bus, the SCSI command including a target number and an LUN, receiving a domain number assigned to the connection to the SCSI bus, generating a device address from the domain number, the target number, and the LUN, and executing the SCSI command with one of the storage devices corresponding to the generated device address.

41 Claims, 9 Drawing Sheets

SYSTEM AND METHOD FOR HOST EXPANSION AND CONNECTION ADAPTABILITY FOR A SCSI STORAGE ARRAY

BACKGROUND OF THE INVENTION

1. Field of the Invention

This invention relates generally to accessing storage arrays with SCSI host devices, and more particularly to a novel system and method for expanding the number of SCSI hosts which may access a particular set of storage devices, and for providing connection adaptability between one or more SCSI busses and a storage array.

2. Description of the Background Art

The Small Computer System Interface (SCSI) is a communications protocol standard that has become increasingly popular for interconnecting computers and other input/output devices. The first version of SCSI (SCSI-1) is described in ANSI X3.131-1986. The SCSI standard has underdone revisions as drive speeds and capacities have increased, but certain limitations remain.

According to the SCSI protocol, host devices (e.g., a work station) and target devices (e.g., a hard disk drive) are connected to a single bus in daisy-chain fashion. Each device on the bus, whether a host or a target, is assigned a unique ID number. The number of devices which may be connected to the bus is limited by the number of unique ID numbers available. For example, under the SCSI-1 protocol, only eight devices could be connected to the SCSI bus. Later versions of the SCSI protocol provided for sixteen devices, and future versions will undoubtedly facilitate the connection of an even greater number of devices to a single SCSI bus.

In addition to limiting the number of devices that may be attached to a single SCSI bus, the protocol also limits the number of logical units (e.g. individual drives) that may be accessed through a particular target number. For example, according to the SCSI-1 standard, the number of logical units per target device was also limited to eight. Thus, a particular target (e.g., a disk array) could provide access to eight logical units (disk drives), the target number and the logical unit number uniquely identifying a particular storage device on the SCSI system.

In order to increase the number of hosts which can access a particular target storage device, multiple SCSI busses have been connected together in a multi-level tree structure, with routing devices passing data and commands between levels. In such multi-level networks, hosts suffer performance delays when accessing devices which are more than one level away. Additionally because of the above described limitations, current SCSI systems are unable to take advantage of the benefits offered by current storage arrays, which provide parallel access to a large number of storage devices. Typically, the number of storage devices exceeds the available number of target and logical unit numbers available on the SCSI system. Furthermore, each SCSI bus may be used by only one host at a time, thus preventing parallel access to the storage array by any two hosts on the same SCSI bus. Hosts on different levels of a multi-level system can access different devices on a storage array in parallel, but such parallel access increases the complexity and cost of the routers which interconnect the levels.

What is needed is an interface that increases the number of hosts that can access a storage array beyond the SCSI bus limit. What is also needed is an interface which increases the number of storage elements that can be accessed by a host beyond the target and logical unit number limits. What is also needed is a system which provides parallel access to predetermined groups of devices within a storage array by a number of separate SCSI busses.

SUMMARY

The present invention overcomes the limitations of the prior art by providing a SCSI storage system including a SCSI bus and a storage array interconnected by a novel interface that assigns a domain number to the connection between the SCSI bus and the interface. SCSI commands received by the interface include a target number and a logical unit number (LUN), which are used by the interface, in combination with the domain number, to map the SCSI command to a particular device of the storage array.

A particular embodiment of the interface includes a SCSI interface chip for receiving the SCSI command from the SCSI bus, a domain indicator for providing a domain number assigned to the SCSI chip, a memory device for storing data and code, and a processing unit responsive to the code and operative to generate a device address from the domain number, the target number, and the logical unit number, and to execute the SCSI command with a particular device of the storage array corresponding to the device address. The domain indicator may be either hardware based (e.g. a mechanical selector switch) or software based (e.g., written to a data storage device of the interface via a SCSI host or the storage array).

The memory device includes a mapping unit (block of code) for generating the device address from the domain number, the target number, and the LUN. In a particularly simple embodiment, the mapping unit generates a device index by concatenating the domain number, the target number, and the LUN, and the device index is equal to the device address. Optionally, the device index may be used to generate the device address in a number of alternative ways, including but not limited to using the device index to retrieve the device address from a look-up-table, or performing a logical operation on the device index to generate the device address.

Another particular embodiment further includes a second SCSI interface chip for receiving a SCSI command, a second domain indicator for providing a second domain number assigned to the second SCSI chip, a second memory device for storing data and code, and a second processing unit responsive to the code and operative to generate a device address from the second domain number, the target number, and the logical unit number, and to execute the SCSI command with a particular device of the storage array corresponding to the device address. Optionally, the memory device and the second memory device include code for implementing the same mapping scheme. Alternatively, the memory device and the second memory device contain code for implementing independent arbitrary mapping schemes.

An alternate embodiment of the present invention includes a remote SCSI bus adapter and a separate SCSI domain interface controller connected by a serial communication link. The remote SCSI bus adapter includes a SCSI interface chip for receiving a SCSI command (including a target number and a logical unit number) from a SCSI bus, a domain indicator for providing a domain number assigned to the SCSI chip, and a serial interface chip for generating a serial transmission including the SCSI command and the domain number. The SCSI domain interface controller includes a serial interface chip for receiving the serial transmission, a memory device for storing data and code, and a processing unit responsive to the code and operative to generate a device address from the domain number, the target number, and the logical unit number, and to execute the SCSI command with a particular device of the storage array corresponding to the device address.

The present invention further includes a method for interfacing a host on a SCSI bus with a storage array including a plurality of storage devices. The method includes the steps of receiving a SCSI command (including a target number and an LUN) from the host via a connection to the SCSI bus, receiving a domain number assigned to the connection to the SCSI bus, generating a device address from the domain number, the target number, and the LUN, and executing the SCSI command with one of the storage devices corresponding to the generated device address. In a particular method, the step of generating a device address includes a step of generating a device index from the domain number, the target number, and the LUN. In a more particular method, the device index is generated by concatenating the domain number, the target number, and the LUN.

In a particularly simple method, the device index is equivalent to an address corresponding to a particular device of the storage array. Optionally, the step of generating a device address includes a step of using the device index to retrieve a device address from a lookup-table, or a step of performing a logical operation on the device index to generate a device address.

BRIEF DESCRIPTION OF THE DRAWINGS

The present invention is described with reference to the following drawings, wherein like reference numbers denote substantially similar elements.

DETAILED DESCRIPTION

The present invention overcomes the problems associated with the prior art, by providing an interface which connects one or more SCSI busses to particular groups of devices of a storage array, based on a novel configuration parameter called a SCSI domain number. Specifically the present invention describes a system and method for expanding the number of hosts that can access the same storable devices and expanding the number of storage devices that can be accessed by a particular host. In the following description, numerous specific details are set forth (e.g., the type of storage array, the number of SCSI busses connected to the array, and the number of SCSI domains) in order to provide a thorough understanding of the invention. Those skilled in the art will recognize, however, that the invention may be practiced apart from these specific details. In other instances, well known details of SCSI systems and storage arrays/controllers have been omitted, so as not to unnecessarily obscure the present invention.

Figure 1:
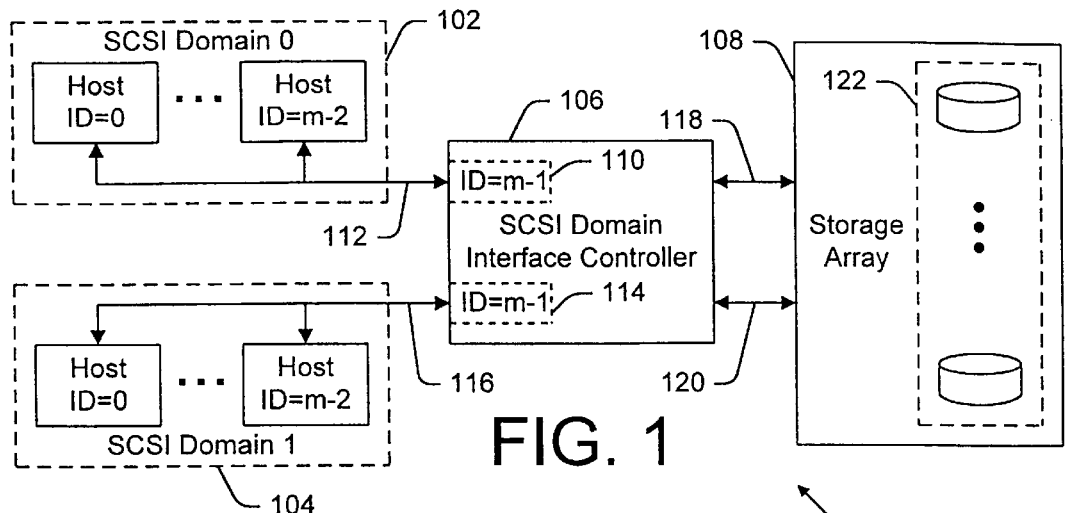
FIG. 1 is a block diagram of a host-expanded SCSI storage system in accordance with the present invention.

FIG. 1 is a block diagram of a host-expanded SCSI storage system 100 in accordance with the present invention. System 100 includes a first group 102 of SCSI hosts (SCSI Domain 0), a second group 104 of SCSI hosts (SCSI Domain 1), an interface controller 106, and a storage array 108. SCSI hosts 102 are connected to a first port 110 of interface controller 106 by a first physical SCSI bus 112. Each device on SCSI bus 112, including hosts 102 and port 110, is assigned a unique ID number (Target Number) ranging from (0) to (m-1), where (m) is the maximum number of devices permitted on bus 112 by the particular SCSI protocol in use. Similarly, each of hosts 104 is connected to a second port 114 of interface controller 106 by a second physical SCSI bus 116, with each device on SCSI bus 116 having a unique ID number ranging from (0) to (m-1). Although FIG. 1 shows ports 110 and 114 being assigned the highest possible ID number (m-1), those skilled in the art will recognize that this should not be construed n a limiting, sense and that ports 110 and 114 may be assigned any ID number from (0)–(m-1), as long as no other devices on their respective SCSI busses 112 and 116 have the same ID number.

Interface controller 106 communicates with storage array 108 via a pair of independent busses 118 and 120. Each of busses 118 and 120 includes a plurality of data and control lines for communicating with and transferring data to and from storage array 108. Those skilled in the art will understand that the precise number and function of data and control lines depend on the particular storage array being accessed, and that such information is customarily provided by the manufacturers of such storage arrays. Those skilled in the art will also understand that the number of busses connecting interface controller 106 and storage array 108 may vary depending on the needs of the particular system, but to provide full parallel access to storage array 108 by a group of separate SCSI busses, one bus to storage array 108 is needed for each separate SCSI bus.

Storage array 108 includes a plurality 122 of individual storage devices (0-x), where (x) typically exceeds the number of logical unit numbers allocated to each target ID under the SCSI protocol. Hosts 102 and 104 communicate with devices 122 of storage array 108 as follows. Each port 110 and 114 of interface controller 106 is assigned a SCSI domain number (0 and 1, respectively). The SCSI domain number is user selectable and may be assigned via hardware (e.g., thumbwheel, dip switch etc.) or software (e.g., programmed into a non-volatile data storage device v ia a host device or the storage array user interface, or loaded from the storage array configuration at power-up). When one of hosts 102 issues a SCSI command directed to target (m-1) and a particular logical unit number (LUN), interface controller 106 receives the command, generates a device address from the target number, the LUN, and the domain number (0) associated with port 110, and executes the command with a device of the storage array corresponding to the Venerated device address. Similarly, when one of hosts 104 issues a SCSI command directed to target (m-1) and a particular logical unit number (LUN), interface controller 106 receives the command, generates a device address from the target number, the LUN, and the domain number (1) associated with port 114, and executes the command with a device of the storage array corresponding to the generated device address.

Interface controller 106 may be designed to implement any useful mapping scheme for mapping the host commands to particular storage devices. For example, interface controller 106 can map commands from SCSI Domain 0 and SCSI Domain 1 to mutually exclusive groups of storage devices. Alternatively, interface controller 106 may be designed to map commands from SCSI Domain 0 and SCSI Domain 1 to intersecting groups of storage elements. In either case, the user can easily switch between predetermined groups of storage devices by changing the SCSI Domain number associated with a particular port.

Figure 2:
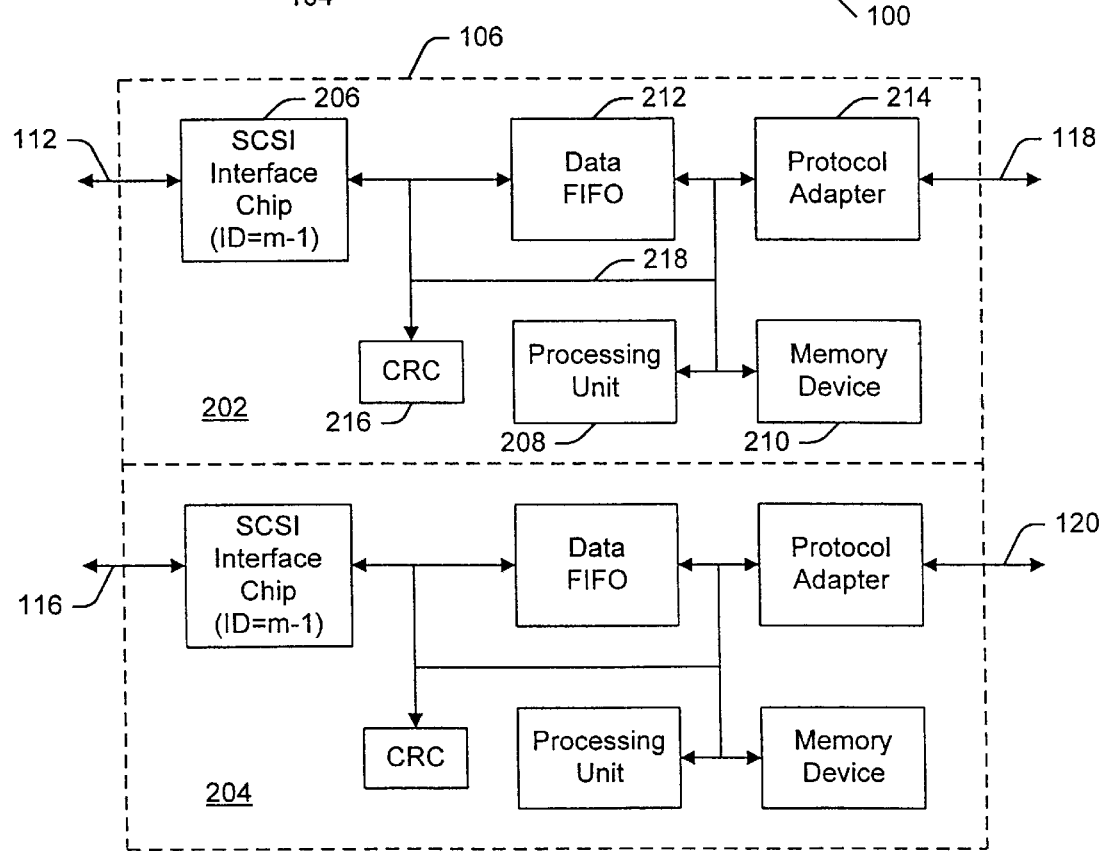
FIG. 2 is a block diagram of a SCSI domain interface controller shown in FIG. 1.

FIG. 2 is a block diagram showing SCSI domain interface controller 106 in greater detail, to include two independent interface channels 202 and 204. Interface channel 202 includes a SCSI interface chip 206, a processing unit 208, a memory device 210, a data FIFO (first-in-first-out register) 212, a protocol adapter 214, and a cyclic redundancy check (CRC) 216, all intercommunicating through a central bus 218.

SCSI interface chip 206 passes data and SCSI commands between SCSI bus 112 and central bus 218, under the control of processing unit 208. Memory device 210 stores data and code, for access and execution by processing unit 208. Processing unit 208 executes the code stored in memory device 210, thereby controlling the transfer of data and commands through interface channel 202. Data FIFO 212 provides buffer storage for data passing through interface channel 202. Protocol adapter 214 provides bi-directional translation between the protocol of processing unit 208 and the protocol of storage array 108. CRC 216 monitors the data stream on central bus 218, performs periodic operations on the data, checks the results of the operations against expected values, and issues an error message if unexpected results are obtained.

In a particular embodiment, processing unit 208 is an Intel™ i960CA microprocessor, memory device 210 is a Motorola™ MCM 67B618AFN12 random-access-memory (RAM), data FIFO 212 is an IDT™ 7206 FIFO and SCSI interface chip 206 is a Symbios™ SYM53C770 interface chip. protocol adapter 214 and CRC 216 are custom designed application specific integrated circuits (ASICs). The design and implementation of a custom ASIC, such as protocol adapter 214, to translate between established protocols is well known to those skilled in the art.

Separate interface channels 202 and 204 are provided for ports 112 and 116, respectively, to allow simultaneous access to storage array 108 via SCSI busses 112 and 116. Interface channel 204 is substantially identical in both structure and function to interface channel 202.

Figure 3:
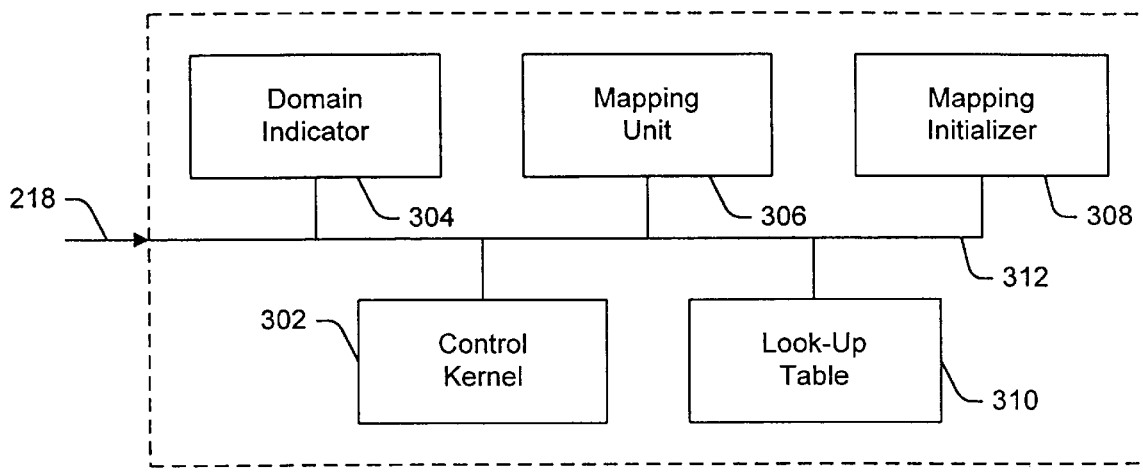
FIG. 3 is a block diagram of a memory device shown in FIG. 2.

FIG. 3 is a block diagram of memory device 210, showing the blocks of code responsible for imparting particular functionality to processing unit 208 when executed. Memory device includes a control kernel 302, a domain indicator 304, a mapping unit 306, a mapping initializer 308, and a look-up-table 310, all interconnected by a memory bus 312. Control kernel 302 is invoked at start-up and provides overall control of the general functionality of interface channel 202. Domain indicator 304 stores a domain number assigned to SCSI interface chip 206. Mapping unit 306 generates a device index from target numbers, LUNs, and the domain number stored in storage indicator 304. Mapping initializer 308 reads configuration information from storage array 108 at start up and provides variable definitions to mapping unit 306 which dictate how device addresses are generated. Look-up-table 310 provides a means for arbitrarily mapping the device index generated by mapping unit 306 to a device address of a particular one of the storage devices of storage array 108. In a particularly simple alternate embodiment, the device address generated by mapping unit 306 is equivalent to the address of the desired storage unit, and look-up-table 310 is unnecessary.

Figure 4:
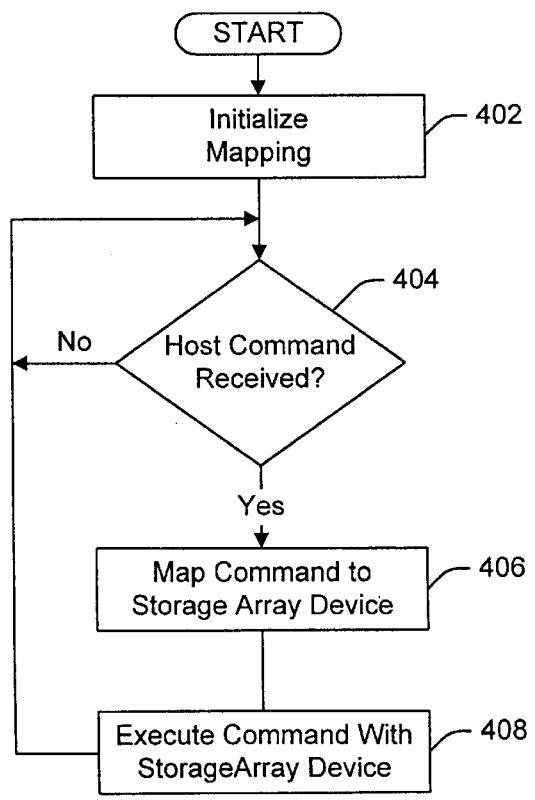
FIG. 4 is a flow chart summarizing a method for connecting a SCSI bus to a storage array in accordance with the present invention.

FIG. 4 is a flow chart summarizing a method 400 for interfacing a SCSI bus to a storage array according to the present invention. In a first step 402, mapping initializer 308 initializes the device mapping scheme, defining how storage device addresses will be generated from target numbers, LUNs, and domain numbers. Next, in a second step 404, processing unit 208 determines whether a SCSI command has been received from one of hosts 102 by SCSI interface chip 206, as indicated by an interrupt signal being asserted on bus 218 by SCSI interface chip 206. If, in step 404, processing unit 208 determines that a SCSI command has been received, then in a third step 406 mapping unit 306 is invoked to map the command to a particular storage device of storage array 108. Then, in a fourth step 408, processing unit 208 executes the command, via protocol adapter 214, with the particular storage array device. After fourth step 408, method 400 returns to second step 404 to determine whether another SCSI command has been received from one of hosts 102. If, in second step 404, processing unit 208 had determined that a SCSI command had not been received, then method 400 would have repeated second step 404 until processing unit 208 detected an interrupt signal from SCSI interface chip 206, indicating that a SCSI command had been received from one of hosts 102.

Figure 5:
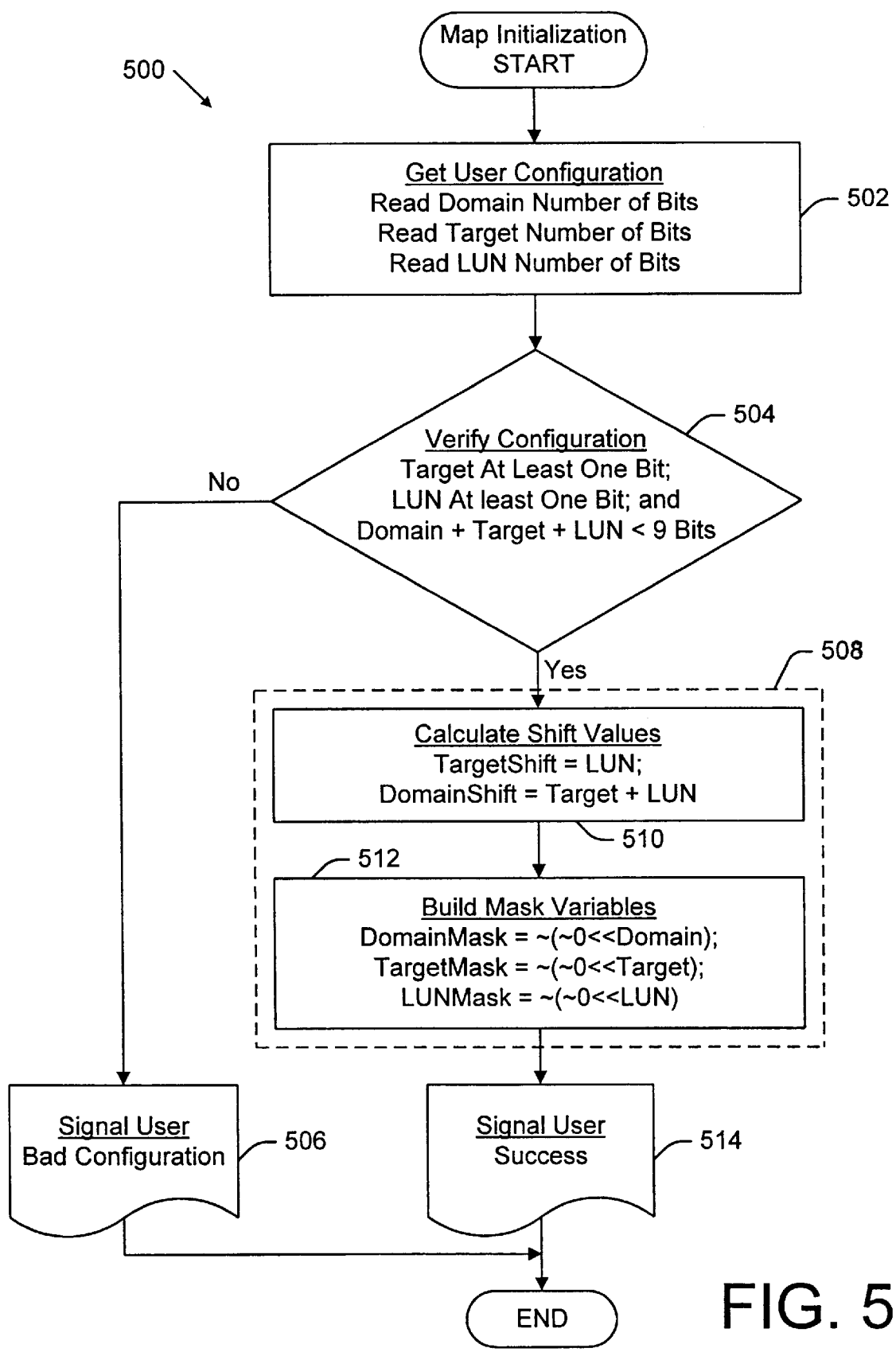
FIG. 5 is a flow chart detailing a method of a step of initializing a device mapping scheme shown in FIG. 4.

FIG. 5 is a flow chart summarizing a method 500 of implementing second step 402 (initializing the device mapping scheme) of method 400. In a first step 502, processing unit 208 invokes map initializer 308 to get the user configuration from storage array 108. The user configuration includes the number of bits used to define the SCSI domain number, the number of bits used to define a target number, and the number of bits used to define an LUN. For example, if the particular SCSI protocol allows for 8 target numbers per SCSI bus and 8 LUNs per target, then 3 bits are necessary to specific a target number, and 3 additional bits are required to specify a LUN. The number of bits required to specify a domain number depends on the desired number of SCSI domains, where (n) bits can specify $2^n$ unique SCSI domains.

In this particular embodiment, the user configuration is stored in storage array 108, and may be altered through the user interface (not shown) of storage array 108. Using the storage array to provide the user configuration insures that interface channel 202 and interface channel 204, as well as any other connected interface cards, are configured consistently. Alternatively, the user configuration may be permanently stored in a nonvolatile storage device in interface controller 106. Optionally, the user configuration stored in interface controller 106 may be altered by a host on one of the SCSI busses attached to interface controller 106.

Next, in a second step 504, mapping initializer 308 verifies the received user configuration. In particular, mapping initializer 308 determines whether the target numbers and the LUNs are defined to include at least one bit. Additionally, in embodiments which generate a storage device address simply by concatenating the domain number, the target number, and the LUN, mapping initializer 308 determines whether the total number of bits is less than or equal to the number of bits in a valid storage device address. If any of the verification conditions are not true, then in a third step 506, mapping initializer 308 signals the user that the configuration is bad, and step 402 ends.

If, however, in second step 504, all of the verification conditions are true, then in a fourth step 508, mapping initializer 308 uses the domain number of bits, the target number of bits and the LUN number of bits to define how storage device identifiers will be generated by mapping unit 306. Fourth step 508 includes a first sub-step 510 of calculating shift values, and a second sub-step 512 of building mask variables, which will be recognized by those skilled in the art to form a storage device identifier by concatenating the binary values of the domain number, the target number, and the LUN. In particular, the bits of the LUN become the least significant bits of the device identifier, the bits of the target number become the next least significant bits of the device identifier, and the bits of the domain number become the most significant bits of the device identifier.

Finally, in a fifth step 514, mapping initializer 308 signals the user that initialization was successfully completed, and method 500 ends.

Figure 6:
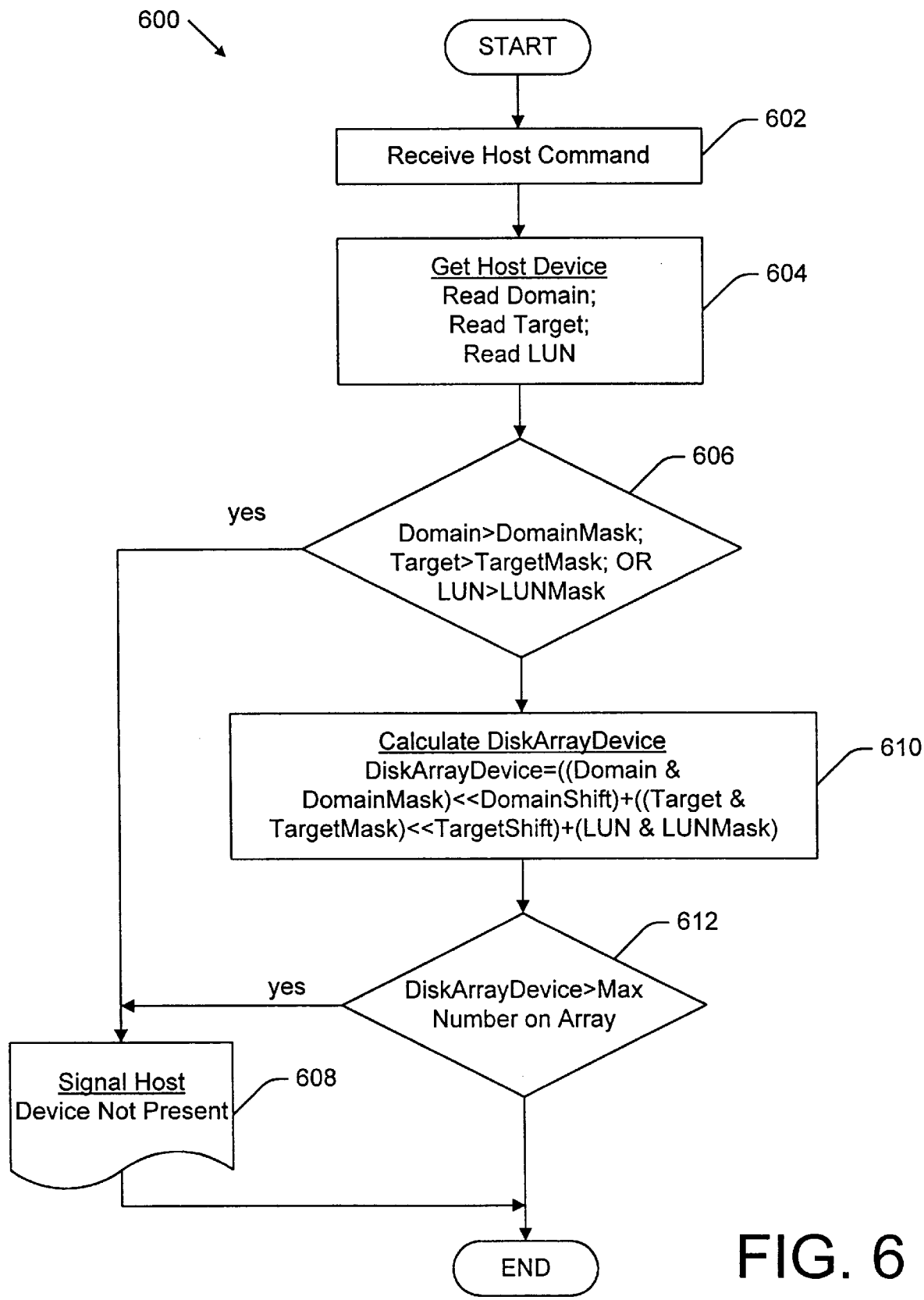
FIG. 6 is a flow chart detailing a method of a step of mapping a command to a storage array device shown in FIG. 4.

FIG. 6 is a flow chart detailing a particular method 600 of performing step 406 (mapping a SCSI command to a storage array device) of method 400. In a first step 602, processing unit 208 receives the SCSI command (including a target number and a LUN) from SCSI interface chip 206, and in a second step 604 invokes mapping unit 306 to read the domain number from storage location 304 and the target number and LUN from the received command. In a third step 606, mapping unit 306 compares the received domain number, target number, and LUN to their respective mask variables to insure that th-e host command is addressing a device which matches the system configuration.

If in third step 606, any of the domain, the target or the LUN are larger than their respective mask variables, then in a fourth step 608 mapping, unit 306 signals the host the device it is attempting to access is not present, and method 600 ends. If, however, in third step 606 none of the domain, the target, or the LUN are larger than their respective mask variables, then in a fifth step 610 mapping unit 306 generates a device index by concatenating, the domain number, the target number, and the LUN.

In one embodiment, the device index is equivalent to the address of a particular storage array device. Alternatively, mapping unit 306 uses the index to retrieve corresponding device address from look-up-table 310. While using the device index as the device address is the simpler of the two approaches, using the index to look up a storage device address provides greater flexibility. In particular, if the index is the device address, then the groups of storage devices accessed with different domain numbers are necessarily mutually exclusive. On the other hand, using the index to retrieve a device address from look-up-table 310 provides maximum flexibility, because look-up-table 310 may be arbitrarily designed to associate any of the devices of storage array 108 with any index.

After mapping, unit 306 generates the device address in fifth step 610, then in a sixth step 612, mapping unit 306 checks to insure that the generated device address does not exceed the number of devices on storage array 108. If the generated address is higher than the highest allowable address, then method 600 proceeds to fourth step 608 and signals the host that the device is not present. Otherwise, method 600 ends.

Figure 7:
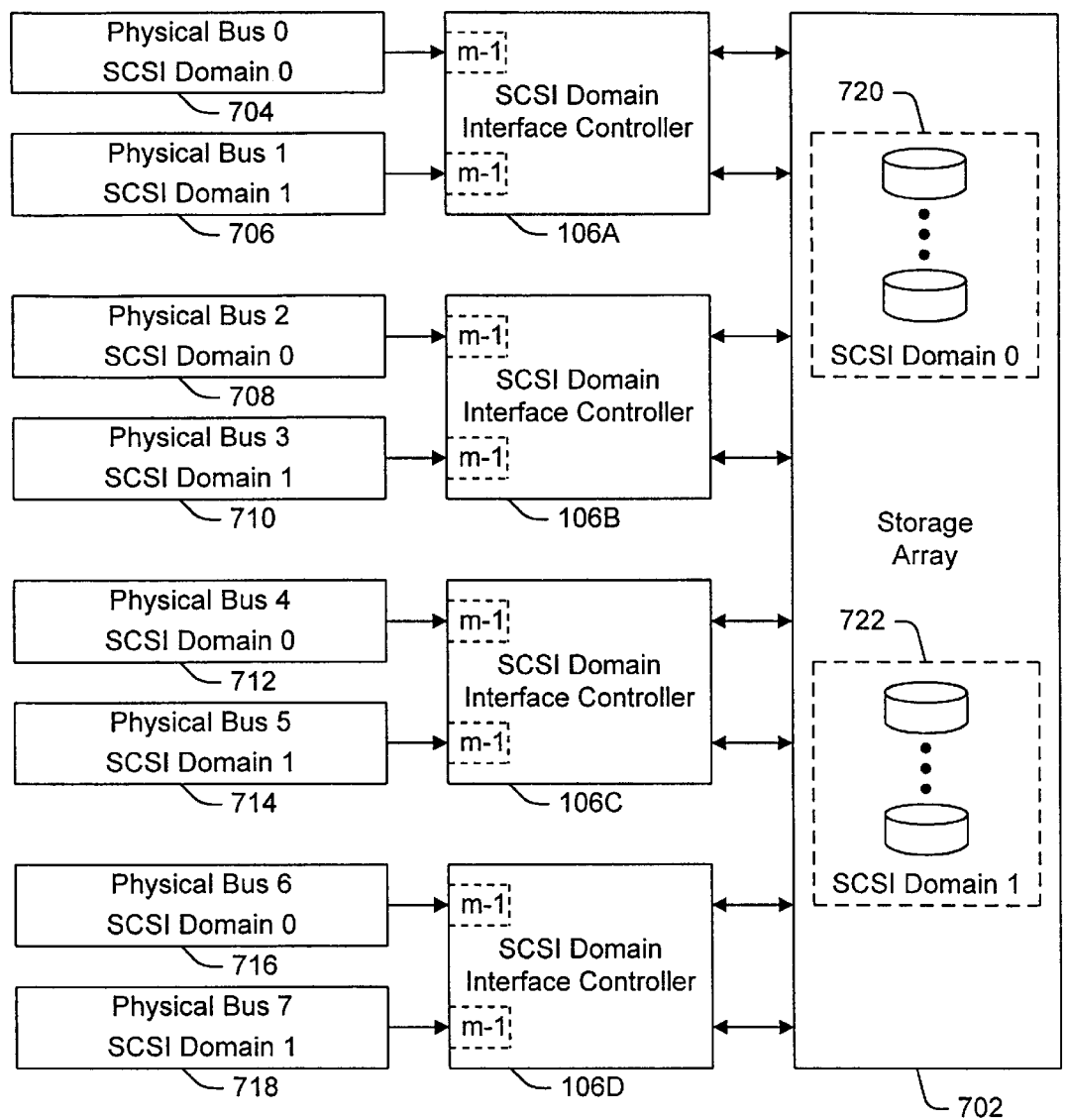
FIG. 7 is a block diagram of an alternate host-expanded SCSI storage system.

FIG. 7 is a block diagram of an alternate host-expanded SCSI storage system 700, in accordance with the present invention. System 700 is similar to system 100, except that system 700 includes a storage array 702 which is capable of supporting four SCSI domain interface controllers 106 (A–D), each of which is substantially identical to SCSI interface controller 106 of FIG. 1. Interface controller 106A connects a physical SCSI bus (0) 704 and a physical SCSI bus (1) 706 to storage array 702; interface controller 106B connects a physical SCSI bus (2) 708 and a physical SCSI bus (3) 710 to storage array 702; interface controller 106C connects a physical SCSI bus (4) 712 and a physical SCSI bus (5) 714 to storage array 702; and interface controller 106D connects a physical SCSI bus (6) 716 and a physical SCSI bus (7) 718 to storage array 702. Each of physical busses 704, 706, 708, 710, 712, 714, 716, and 718 support a plurality of SCSI hosts.

In a particular embodiment, storage array 702 is a RAMAC Virtual Array Model No. 9393, manufactured by International Business Machines Corporation, and will accept up to eight SCSI domain interface controllers.

Although each of interface controllers 106(A–D) could be configured independently to map their connected hosts to arbitrary groups of storage devices, configuring each of interface controllers 106(A–D) consistently provides a convenient way to connect a SCSI bus of hosts to a predetermined group of storage devices simply by selecting the domain number associated with the particular bus. For example, physical busses 704, 708, 712, and 716 are all assigned domain number (0), and therefore all access a first group 720 of storage devices within storage array 702. Physical busses 706, 710, 714, and 718 are all assigned domain number (1), and therefore all access a second group 722 of storage devices within storage array 702.

Although FIG. 7 shows one domain (0) bus and one domain (1) bus connected to each of interface controllers 106(A–D), any of busses 704, 706, 708, 710, 712, 714, 716, and 718 may be assigned any domain number. For example, if physical bus (7) 718 is switched from domain (1) to domain (0), then both of busses 716 and 718 would access first group 720 of storage devices. Additionally, a greater number of domain values may be employed. In fact, there is no conceptual limit to the number of possible domain values, only the practical limit of the number of bits dedicated to specifying the domain number.

Figure 8:
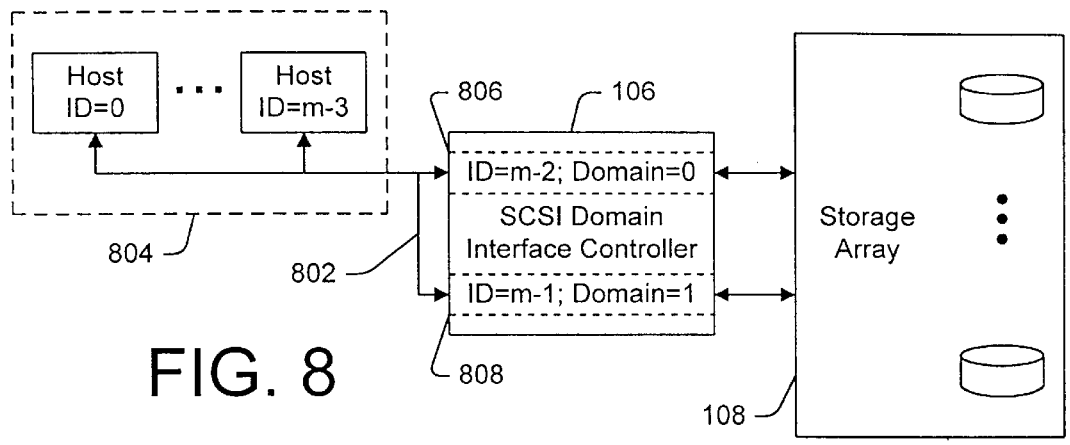
FIG. 8 is a block diagram of an alternate SCSI storage system with a dual domain bus.

FIG. 8 is a block diagram of an alternate SCSI storage system 800 with a dual domain bus 802. Bus 802 supports a group 804 of SCSI hosts, and is connected to two ports 806 and 808 i1 of interface controller 106. Port 806 is assigned target number (m-2) and domain number (0), and port 808 is assigned target number (m-1) and domain number (1). Thus configured, hosts 804 can access a first group of storage devices associated with domain (0) through target number (m-2) and can access a second group of storage devices associated with domain (1) through target number (m-1).

System 800 illustrates the fact that a domain number is assigned to the connection (e.g. the port or the SCSI interface chip) between a physical SCSI bus and a SCSI domain interface controller. In the particular case where there is only one connection between the bus and the interface the domain number assigned to the connection may be considered to be assigned to the bus. However, where there are multiple connections between the bus and the interface controller, the bus may not be limited to a single domain.

Figure 9:
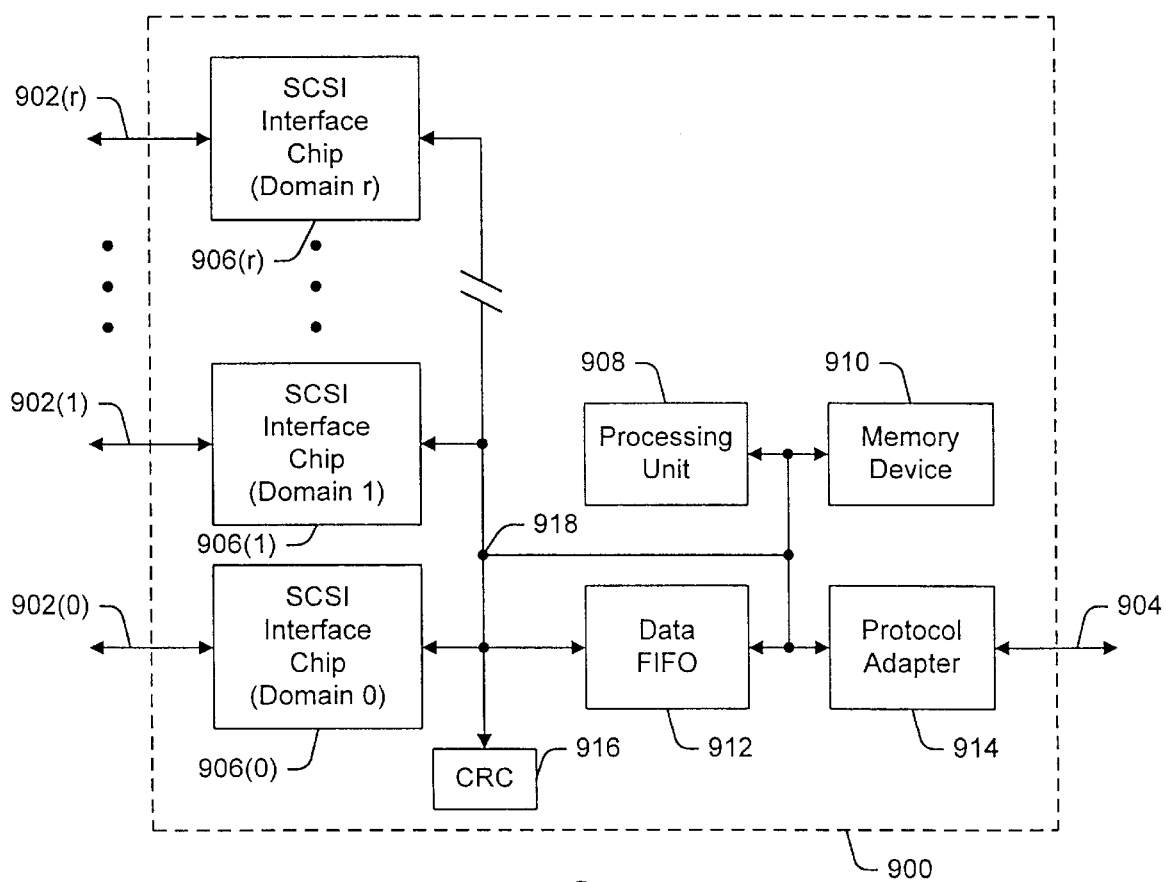
FIG. 9 is a block diagram of an alternate SCSI domain interface controller.

FIG. 9 is a block diagram of an alternate SCSI domain interface controller 900 capable of interfacing a plurality of SCSI busses 902(0-r) to a single storage array bus 904. Interface controller 900 includes a plurality of SCSI interface chips 906(0-r), a processing unit 908, a memory device 910, a data FIFO 912. a protocol adapter 914, and a CRC 916, all communicating through a central bus 918. Interface controller 900 is substantially similar to interface controller 106, except that memory device 910 contains code which allows processing unit 908 to control each of SCSI interface chips 902(0-r). Each of interface chips 906(0-r) is individually addressable by processing unit 908, and may each be assigned any valid target and domain number. Interface controller 900 greatly increases the number of SCSI hosts which can access a storage array, but the access is limited to one host at a time.

Figure 10:
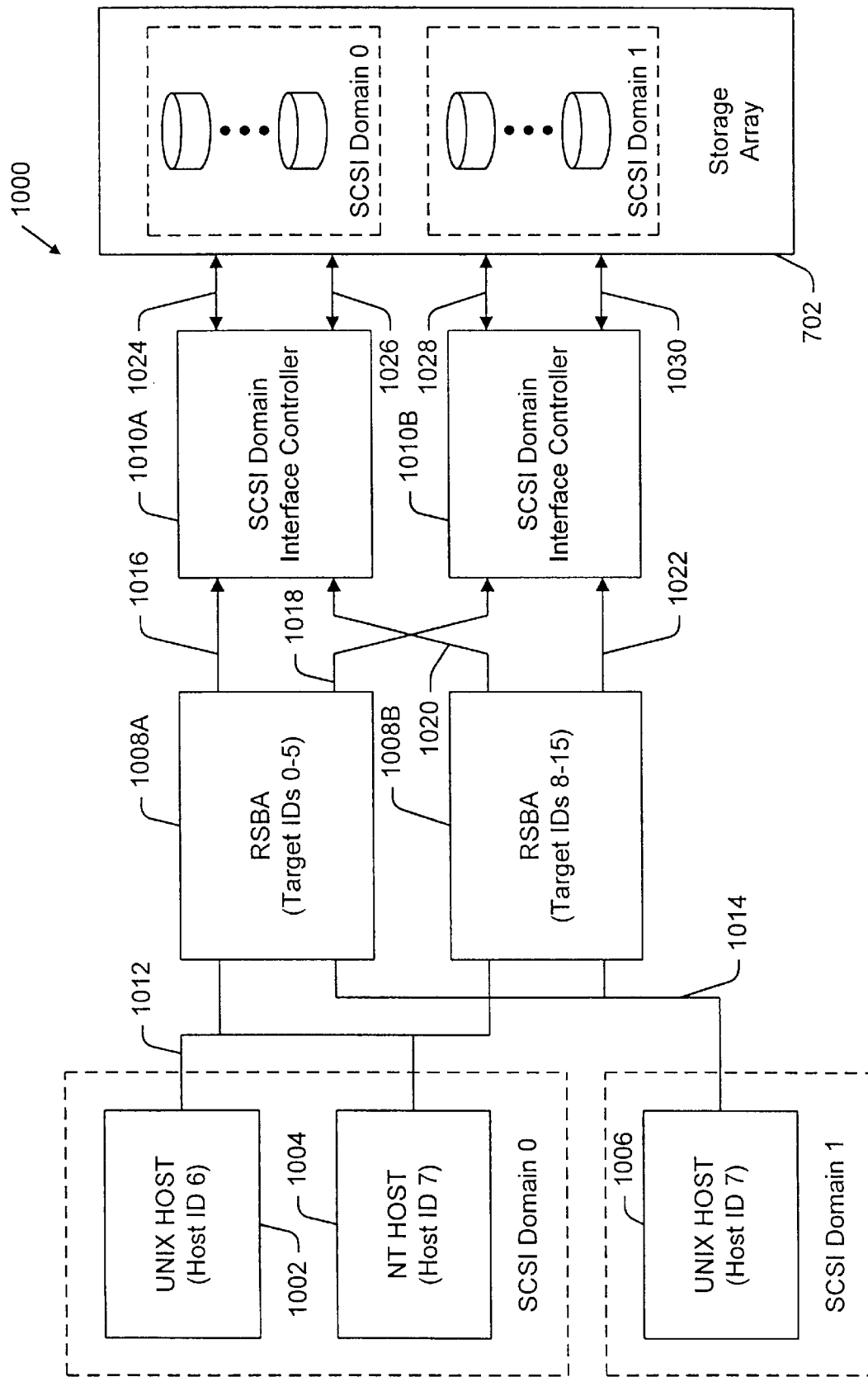
FIG. 10 is a block diagram of another alternate host-expanded SCSI storage system.

FIG. 10 is a block diagram of another alternate host-expanded SCSI storage system 1000, which provides for greater physical separation between connected hosts and a storage array. Storage system 1000 includes a first UNIX host 1002, an NT host 1004, a second UNIX host 1006, a first remote SCSI bus adapter (RSBA) 1008A, a second RSBA 1008B, a first SCSI domain interface controller 1010A, a second SCSI domain interface controller 1010B, and a storage array 702. UNIX host 1002 and NT host 1004 are connected to a first port of RSBA 1008A and a first port of RSBA 1008B, via a first SCSI bus 1012. UNIX host 1006 is connected to a second port of RSBA 1008A and a second port of RSBA 1008B, via a second SCSI bus 1014. First RSBA 1008A is connected to first SCSI domain interface controller 1010A via a fiber optic link 1016, and is connected to second SCSI domain interface controller 1010B via a fiber optic link 1018. Second RSBA 1008B is connected to first SCSI domain interface controller 1010A via a fiber optic link 1020, and is connected to second SCSI domain interface controller 1010B via a fiber optic link 1022. First SCSI domain interface controller 1010A is coupled to storage array 108 via buses 1024 and 1026, and second SCSI domain interface controller 1010B is coupled to storage array 108 via buses 1028 and 1030.

RSBA's 1008A and 1008B receive SCSI commands from host 1002, 1004, and 1006, insert a SCSI domain number into the commands, serialize the commands, and transmit the commands via fiber optic links 1016, 1018, 1020, and 1022 to SCSI domain interface controllers 1010A and B. SCSI domain interface controllers 1010A and 1010B receive the serialized SCSI commands, including the inserted domain number, and map the commands to a particular storage device of storage array 702. The cross-over of fiber optic links 1018 and 1020 provides an alternate path from RSBA 1008S and 1008B to storage array 108 in the event of failure of one of SCSI domain interface controllers 1010A or 1010B.

Figure 11:
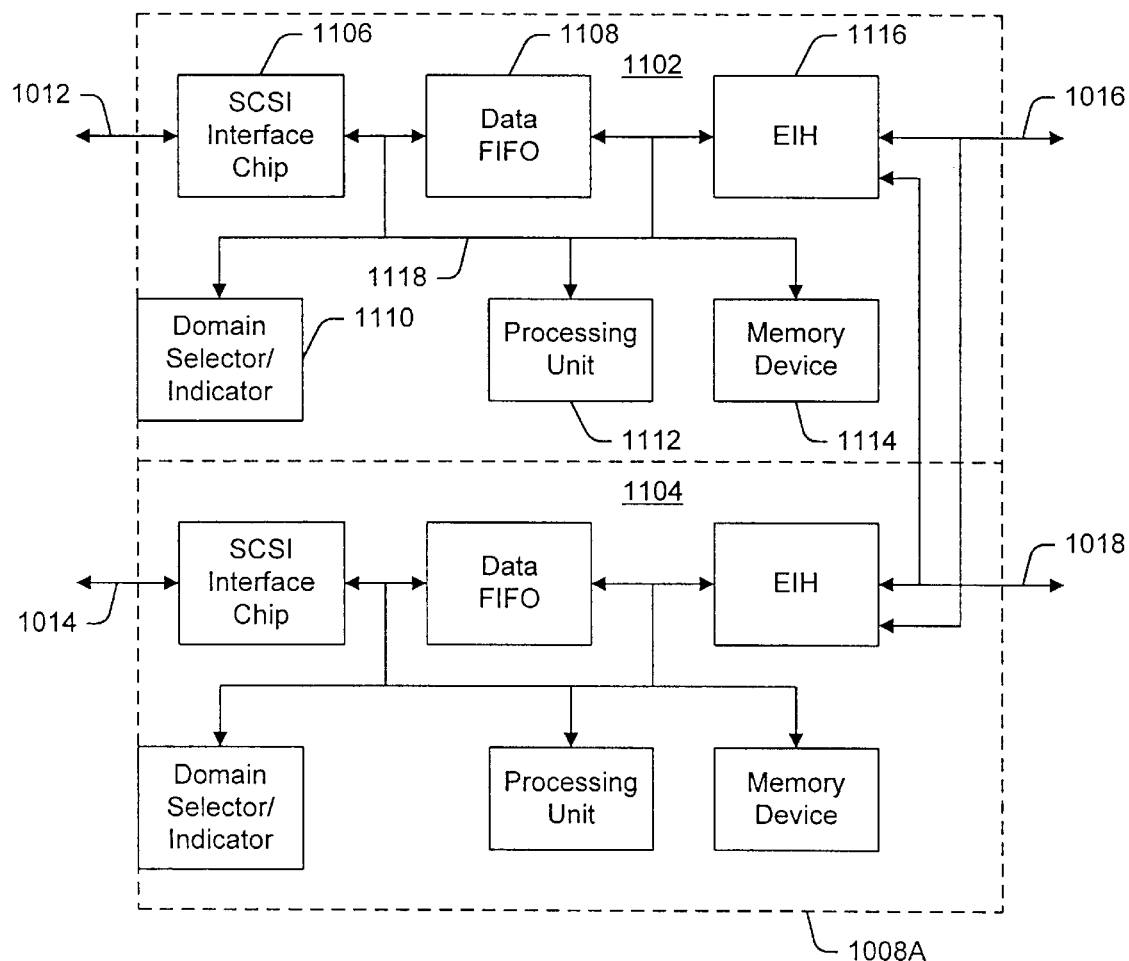
FIG. 11 is a block diagram of a remote SCSI bus adapter (RSBA) shown in FIG. 10.

FIG. 11 is a block diagram showing RSBA 1008A in greater detail, to include two interface channels 1102 and 1104. Interface channel 1102 includes a SCSI interface chip 1106, a data FIFO 1108, a domain selector indicator 1110, a processing unit 1112, a memory device 1114, and an ESCON interface handler (EIH), all interconnected via a central bus 1118. SCSI interface chip 1106 communicates data and SCSI commands between SCSI bus 1012 and central bus 1118, under the control of processing unit 1112. Memory device 1114 stores data and code for access and execution by processing unit 1112. Processing unit 1112 executes the code stored in memory device 1114, and thereby controls the transfer of data and commands through interface channel 1102. Data FIFO 1108 provides buffer storage for data passing through interface channel 1102 in either direction. Domain selector indicator 1110 facilitates user selection of a domain number assigned to SCSI interface chip 1106, and provides the domain number to processing unit 1112, EIH 1116 converts the received SCSI commands to the ESCON standard protocol, and serially transmits the command over fiber optic link 1016 or 1018, including the domain number received from domain selector 1110 in the header information of the serial transmission. Interface channel 1104 is substantially identical to interface channel 1102 in both structure and function.

In a particular embodiment, SCSI interface chip 1106 is a SYMBIOS™ chip number SYM53C770, data FIFO 1108 is an IDT 7206 FIFO, processing unit 1112 is an INTEL™ PENTIUM™ Processor, and domain selector 1110 is a mechanical thumb wheel capable of selecting between domain numbers 0 through 15. EIH 1116 is a custom ASIC designed to implement the ESCON I/O standard developed by International Business Machines Corporation. The ESCON I/O interface standard and its implementation are described in ESCON I/O Interface (document number SA22-7202) and ESCON I/O Interface-Physical Layer (document number SA23-0394-00), respectively, both published by International Business Machines Corporation. Those skilled in the art will recognize that other communication protocols (e.g. ANSI Fibre Channel standard protocol) may be employed to communicate across fiber optic links 1016, 1018, 1020 and 1022.

Figure 12:
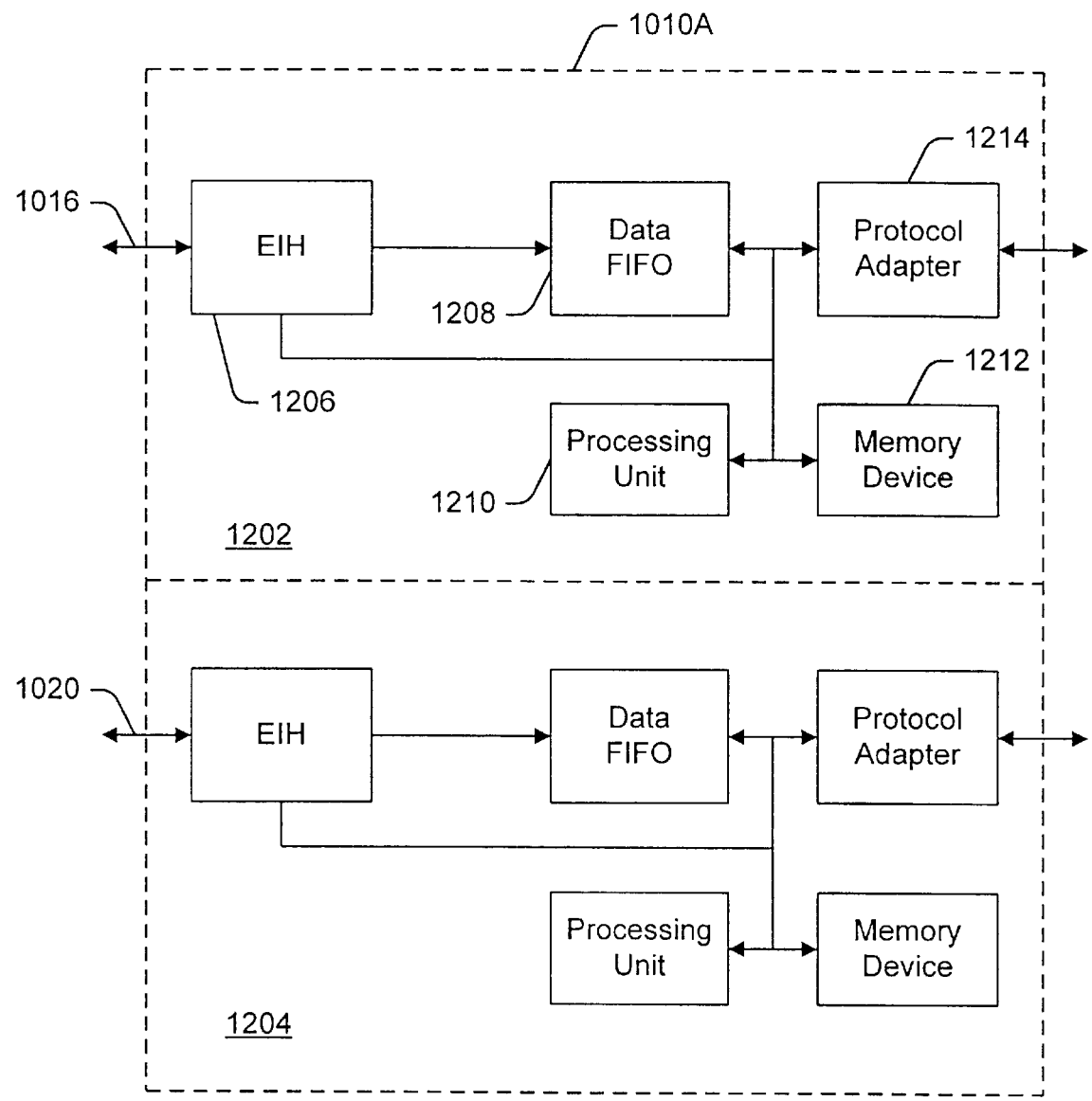
FIG. 12 is a block diagram of a SCSI domain interface controller shown in FIG. 10.

FIG. 12 is a block diagram showing SCSI domain interface controller 1010A in greater detail. Interface controller 1010A includes two parallel interface channels 1202 and 1204. Interface channel 1202 includes an EIH 1206, a data FIFO 1208, a processing unit 1210, a memory device 1212, and a protocol adapter 1214. Interface channel 1202 of interface controller 1010A is substantially similar to interface channel 202 of interface controller 106, except that interface channel 1202 includes EIH 1206 as opposed to a SCSI interface chip. EIH 1206 receives the serially transmitted SCSI commands, including a domain number, a target number and an LUN, and converts the serial transmission to the protocol implemented by processing unit 1210. Processing unit 1210 then uses the domain number, the target number and the LUN from the received command to map the command to a particular storage device of storage array 108, and then executes the command, via protocol adapter 1214 and bus 1024, with the mapped storage device. Interface channel 1204 is substantially identical in both structure and function to interface channel 1902.

The description of particular embodiments of the present invention is now complete. Many of the described features may be substituted, altered or omitted without departing from the scope of the invention. For example, there are countless mechanical devices and/or software techniques that may be employed for selecting and indicating a domain number. Additionally, countless means for mapping an index number to a device address are known to those skilled in the art. Further, the use of the present invention is not limited to interfacing SCSI devices to storage arrays. Rather, the invention may be employed wherever it is desirable to interface a number of SCSI busses to any system having a number addressable devices that exceeds the targets and LUN limits of the SCSI protocol.

What is claimed is:

1. An interface for connecting a SCSI bus to a storage array including a plurality of storage devices, said interface comprising:
   a SCSI interface chip for receiving a SCSI command from said SCSI bus, said SCSI command including a target number and a logical unit number (LUN);
   a domain indicator for providing a domain number assigned to said SCSI chip;
   a memory device for storing data and code; and
   a processing unit responsive to said code and operative to generate a device address from said domain number, said target number, and said LUN, and to execute said SCSI command with a particular device of said storage array corresponding to said device address.

2. An interface according to claim 1, wherein said domain indicator comprises a storage location in said memory device.

3. An interface according to claim 1, wherein said domain indicator comprises a mechanical switch.

4. An interface according to claim 1, wherein said domain indicator comprises a non-volatile data storage device.

5. An interface according to claim 1, wherein said memory device includes a mapping unit for generating a device index number from said domain number, said target number and said LUN.

6. An interface according to claim 5, wherein said mapping unit generates said device index number by concatenating said domain number, said target number and said LUN.

7. An interface according to claim 5, wherein said device index number is an address corresponding to one of said plurality of storage devices.

8. An interface according to claim 5, wherein said memory device further includes a look-up-table for providing an address corresponding to one of said plurality of storage devices responsive to said device index number.

9. An interface according to claim 5, wherein said mapping unit generates an address corresponding to one of said plurality of storage devices by performing a logical operation on said device index number.

10. An interface according to claim 5, wherein said memory device further includes a mapping initializer that at start up reads from said storage array configuration information for a predetermined mapping scheme and provides to the mapping unit said predetermined mapping scheme for generating said device index number.

11. An interface according to claim 1, further comprising:
    a second SCSI interface chip for receiving a second SCSI command, said second SCSI command including a second target number and a second LUN;
    a second domain indicator for providing a second domain number assigned to said second SCSI interface chip;
    a second memory device for storing data and code; and
    a second processing unit responsive to said code stored in said second memory device and operative to generate a device address from said second domain number, said second target number, and said second LUN, and to execute said SCSI command with a particular device of said storage array corresponding to said device address.

12. An interface according to claim 11, wherein said second SCSI interface chip is coupled to a second SCSI bus.

13. An interface according to claim 11, wherein said second SCSI interface chip is coupled to said SCSI buss.

14. An interface according to claim 11, wherein said memory device and said second memory device include code for implementing an identical device mapping scheme.

15. An interface according to claim 1, further comprising:
    a plurality of SCSI interface chips for receiving SCSI commands; and
    a plurality of domain indicators, each for providing a domain number assigned to an associated one of said plurality of SCSI interface chips.

16. An interface according to claim 1, further comprising a serial communication link, said SCSI interface chip and said domain selector being coupled to one end of said serial communication link and said processing unit and said memory device being coupled to an opposite end of said serial communication link.

17. An interface according to claim 16, wherein said serial communication link comprises a fiber optic link.

18. A remote SCSI bus adapter comprising:
    a SCSI interface chip for receiving a SCSI command from a host via a SCSI bus, said SCSI command including a target number and a logical unit number;
    a domain selector indicator for providing a domain number assigned to said SCSI interface chip; and
    an interface handler for converting and serially transmitting via a link to a SCSI domain interface controller said SCSI command and said domain number.

19. The remote SCSI bus adapter of claim 18, further comprising at least one interface channel that includes the SCSI interface chip, domain indicator and interface handler.

20. The remote SCSI bus adapter of claim 18, wherein said link is a fiber optic link.

21. An interface for connecting a SCSI bus to a storage array including a plurality of storage devices, said interface comprising:
    a serial interface chip for receiving a serial transmission including a SCSI command and a domain number, said SCSI command including a target number and a logical unit number;
    a memory device for storing data and code; and
    a processing unit responsive to said code and operative to generate a device address from said domain number, said target number, and said logical unit number, and to execute said SCSI command with a particular device of said storage array corresponding to said device address.

22. A SCSI storage system comprising:
    a storage array;
    a SCSI bus; and
    an interface coupled to said storage array and said SCSI bus, said interface including
       a SCSI interface chip for receiving a SCSI command from said SCSI bus, said SCSI command including a target number and a logical unit number,
       a domain indicator for providing a domain number assigned to said SCSI interface chip,
       a memory device for storing data and code, and
       a processing unit responsive to said code and operative to generate a device address from said domain number, said target number, and said logical unit number, and to execute said SCSI command with a particular device of said storage array corresponding to said device address.

23. An interface for connecting a SCSI bus to a storage array including a plurality of storage devices, said interface comprising:
    receiving means for receiving a SCSI command from said SCSI bus, said SCSI command including a target number and a logical unit number;
    domain indicating means for providing a domain number assigned to said receiving means;

storage means for storing data and code; and processing means, responsive to said code, for generating a device address from said domain number, said target number, and said logical unit number, and for executing said SCSI command with a particular device of said storage array corresponding to said device address.

24. A method for interfacing a host on a SCSI bus with a storage array, said storage array including a plurality of storage devices, said method comprising the steps of:

receiving a SCSI command from said host via a connection to said SCSI bus, said SCSI command including a target number and a logical unit number (LUN);

receiving a domain number assigned to said connection to said SCSI bus;

generating a device address from said domain number, said target number, and said LUN; and executing said SCSI command with one of said storage devices corresponding to said generated device address.

25. A method according to claim 24, wherein said step of generating a device address includes a step of generating a device index from said domain number, said target number, and said LUN.

26. A method according to claim 25, wherein said step of generating said device index includes a step of concatenating said domain number, said target number, and said LUN.

27. An electronically readable medium having code embodied therein for causing a processing unit to perform the steps of claim 26.

28. A method according to claim 25, wherein said step of generating said device address includes a step of defining said device address to be equivalent to said device index.

29. An electronically readable medium having code embodied therein for causing a processing unit to perform the steps of claim 28.

30. A method according to claim 25, wherein said step of generating said device address includes a step of using said index to retrieve said device address from a look-up-table.

31. An electronically readable medium having code embodied therein for causing a processing unit to perform the steps of claim 30.

32. A method according to claim 25, wherein said step of generating said device address includes a step of performing, a logical operation on said device index.

33. An electronically readable medium having code embodied therein for causing a processing unit to perform the steps of claim 32.

34. A method according to claim 25, wherein said step of generating said device address includes a step of receiving a predetermined mapping scheme from said storage array.

35. An electronically readable medium having code embodied therein for causing a processing unit to perform the steps of claim 34.

36. An electronically readable medium having code embodied therein for causing a processing unit to per-form the steps of claim 25.

37. A method according to claim 24, further comprising a step of transmitting said SCSI command and said domain number over a serial communication link between said SCSI bus and said storage array.

38. A method according to claim 37, wherein said step of transmitting said SCSI command and said domain number over a serial communication link includes the step of transmitting said SCSI command and said domain number over an optical fiber.

39. An electronically readable medium having code embodied therein for causing a processing unit to perform the steps of claim 38.

40. An electronically readable medium having code embodied therein for causing a processing unit to perform the steps of claim 37.

41. An electronically readable medium having code embodied therein for causing a processing unit to perform the steps of claim 24.

* * * * *

UNITED STATES PATENT AND TRADEMARK OFFICE
CERTIFICATE OF CORRECTION

PATENT NO. : 6,115,772
DATED : September 5, 2000
INVENTOR(S) : Michael Richard Crater Page 1 of 1

It is certified that error appears in the above-identified patent and that said Letters Patent is hereby corrected as shown below:

Abstract,
Line 13, should read -- storage device of the interface via a SCSI host or the --

Claim 36, column 14,
Line 18, should read -- embodied therein for causing a processing unit to perform --

Signed and Sealed this

Thirtieth Day of October, 2001

Attest:

NICHOLAS P. GODICI
Attesting Officer   Acting Director of the United States Patent and Trademark Office